United States Patent
Kubota et al.

(10) Patent No.: US 7,572,055 B2
(45) Date of Patent: Aug. 11, 2009

(54) OUTSIDE AIR TEMPERATURE DETERMINATION APPARATUS

(75) Inventors: Masatoshi Kubota, Saitama (JP); Masafumi Higashiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/157,907

(22) Filed: Jun. 13, 2008

(65) Prior Publication Data

US 2009/0016405 A1 Jan. 15, 2009

(30) Foreign Application Priority Data

Jul. 11, 2007 (JP) ............................. 2007-182130

(51) Int. Cl.
*G01K 13/00* (2006.01)
(52) U.S. Cl. .............................. 374/142; 374/1; 374/141
(58) Field of Classification Search ................. 374/142, 374/141, 144, 1
See application file for complete search history.

(56) References Cited

U.S. PATENT DOCUMENTS

| | | | |
|---|---|---|---|
| 5,737,243 | A | 4/1998 | Wallrafen |
| 6,974,251 | B2* | 12/2005 | DeRonne et al. ............ 374/144 |
| 2001/0043147 | A1 | 11/2001 | Yamada et al. |
| 2003/0015159 | A1* | 1/2003 | Suzuki ................. 123/142.5 R |
| 2006/0209921 | A1 | 9/2006 | Brown et al. |
| 2008/0196487 | A1* | 8/2008 | Suzuki .................... 73/114.34 |

FOREIGN PATENT DOCUMENTS

JP 01-212637 8/1989

* cited by examiner

*Primary Examiner*—Lisa M Caputo
*Assistant Examiner*—Mirellys Jagan
(74) *Attorney, Agent, or Firm*—Carrier Blackman & Associates, P.C.; William D. Blackman; Joseph P. Carrier

(57) ABSTRACT

The present invention provides an outside air temperature determination apparatus including an outside air temperature detection means (3) disposed in a vehicle for detecting an outside air temperature; a control means (6) having a first determination processing portion (61) which performs a first determination processing to obtain a determination value based on the detection temperature detected by the outside air temperature detection means (3); and a speed detection means (4) for detecting a speed of the vehicle, wherein the control means (6) includes a second determination processing portion (62) which predicts a real outside air temperature based on a variation on the detection temperature detected by the outside air temperature detection means (3) and performs a second determination processing to obtain a determination value based on the predicted outside air temperature; and controls the second determination processing portion (62) to perform the second determination processing (STEP 6) prior to the first determination processing (STEP 7) performed by the first determination processing portion (61) when the speed detected by the speed detection means (3) is accelerated equal to or greater than a predefined speed $V_0$ from a speed lower than the predefined speed $V_0$ (STEP 5). According to the outside air temperature determination apparatus of the present invention, the outside air temperature can be determined instantly and appropriately even though there is a great deviation between the detection temperature and real outside air temperature.

3 Claims, 4 Drawing Sheets

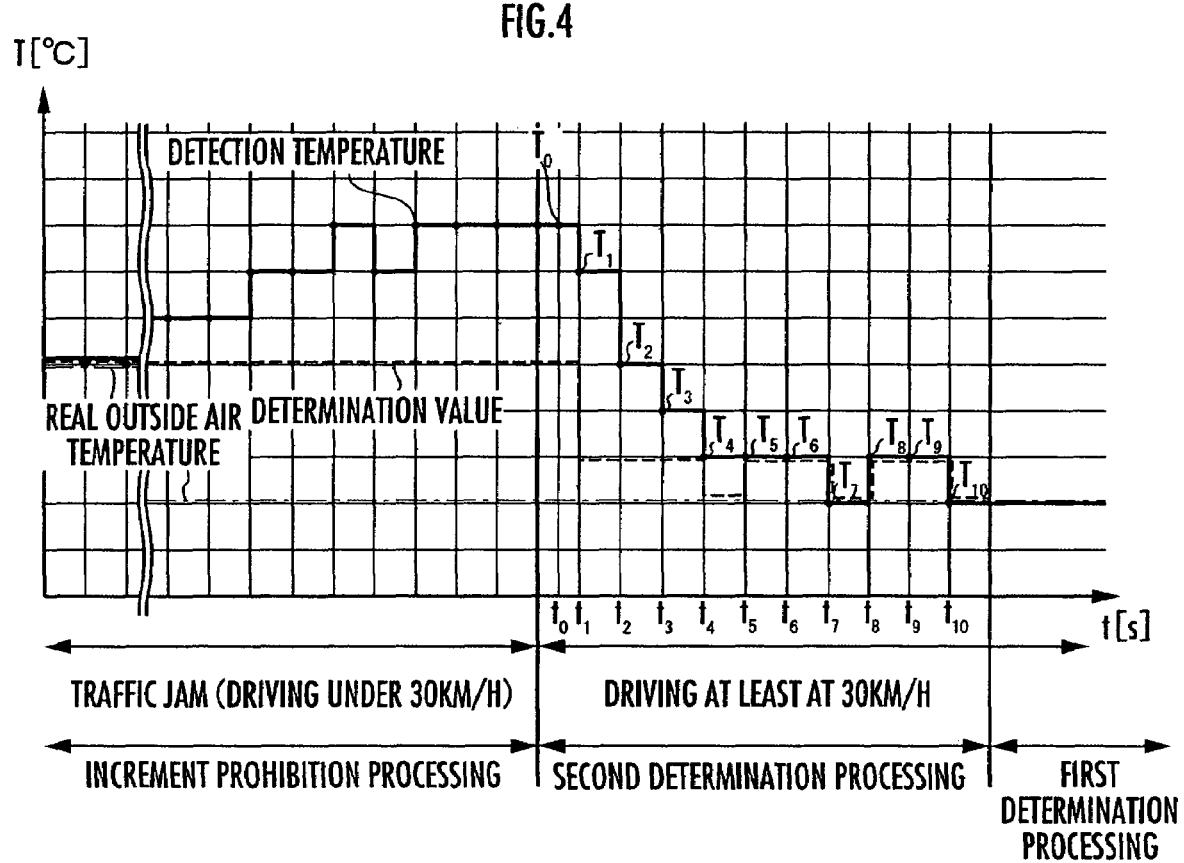

OUTSIDE AIR TEMPERATURE DETERMINATION APPARATUS

BACKGROUND OF THE INVENTION

1. Field of the Invention

The present invention relates to an outside air determination apparatus disposed in a vehicle for determining an outside air temperature.

2. Description of the Related Art

Conventionally, there has been known an outside air temperature determination apparatus including an outside air temperature detection means disposed in an automobile for detecting an outside air temperature and a control means for setting the detection temperature detected by the outside air temperature detection means as a determination value. The determination value obtained by the outside air temperature determination apparatus is output to, for example, a display device disposed inside the automobile to be displayed as an outside air temperature (for example, refer to Japanese Patent Laid-open No. H1-212637).

The outside air temperature determination apparatus disclosed in Japanese Patent Laid-open No. H1-212637 includes a speed detection means for detecting a vehicular speed of the automobile and a memory for storing the determination value. When a vehicular speed detected by the speed detection means is not lower than 20 km/h, the control means compares the detection temperature detected by the outside air temperature detection means with the determination value stored in memory, and if the detection temperature is higher than the determination value, the control means performs a process by adding 1□ to the determination value and storing the result in memory; on the other hand, if the detection temperature is lower than the determination value, the control means performs a process by subtracting 1° C. from the determination value and storing the result in memory.

When a vehicular speed detected by the speed detection means is lower than 20 km/h, the control means performs an increment prohibition processing to prohibit an increment from being added to the determination value even though the detection temperature is higher than the determination value. Accordingly, a wrong temperature may be prevented from being displayed on a display device since the detection temperature detected by the outside air temperature detection means may become higher than real outside air temperature due to radiation heat from a radiator or the like when the automobile travels at a low speed caused by a traffic jam or the like.

The outside air temperature detection means of the conventional outside air temperature determination apparatus is mounted on a front portion of the automobile and detects an air temperature of air inhaled from a radiator grill for cooling the radiator. The outside air temperature detection means is provided with a protection cover to prevent the characteristics of the outside air temperature detection means from being deteriorated by a flying stone, thermal strain according to the radiation heat from such as the radiator, or the like, thus it costs some time for heat of the outside air temperature to be transferred to the outside air temperature detection means.

For the outside air temperature determination apparatus with the above-mentioned configuration, even in cases where the vehicular speed detected by the speed detection means is accelerated equal to or greater than 20 km/h from a speed below 20 km/h, and as a result thereof, the radiation heat from such as the radiator or the like exerts no effect on the detection temperature detected by the outside air temperature detection means, it costs some time for the outside air temperature detection means to sufficiently radiate heat so as to get ready for detecting real outside air temperature appropriately.

Therefore in the conventional outside air temperature determination apparatus, when the vehicular speed detected by the speed detection means is accelerated equal to or greater than 20 km/h from a speed below 20 km/h, even though real outside air temperature is lower than the determination value stored in memory, the processing of adding an increment to the determination value is performed during a duration in which the detection temperature detected by the outside air temperature detection means maintains at a higher temperature for a long time due to the affect from the radiation heat from such as the radiator or the like. Resultantly, there arises a problem that a great deviation appears between real outside air temperature and the determination value. The detection temperature detected by the outside air temperature detection means approximates to real outside air temperature as the time lapses, and eventually the determination value also approximates to real outside air temperature, thereby enabling the outside air temperature to be determined appropriately. However, it will take too much time to reach the aforementioned state.

SUMMARY OF THE INVENTION

The present invention has been accomplished in view of the aforementioned problems, and it is therefore an objective of the present invention to provide an outside air temperature determination apparatus which is capable of determining an outside air temperature instantly and appropriately even though there is a great deviation between a detection temperature and real outside air temperature.

The outside air temperature determination apparatus disposed in a vehicle according to the present invention includes an outside air temperature detection means for detecting an outside air temperature; a control means having a first determination processing portion which performs a first determination processing to obtain a determination value based on the detection temperature detected by the outside air temperature detection means; and a speed detection means for detecting a speed of the vehicle, wherein the control means includes a second determination processing portion which predicts real outside air temperature based on a variation on the detection temperature detected by the outside air temperature detection means and performs a second determination processing to obtain a determination value based on the predicted outside air temperature; and controls the second determination processing portion to perform the second determination processing prior to the first determination processing performed by the first determination processing portion when the speed detected by the speed detection means is accelerated equal to or greater than a predefined speed from a speed lower than the predefined speed.

According to the above-mentioned configuration, when the speed detected by the speed detection means is accelerated equal to or greater than the predefined speed from a speed lower than the predefined speed, even though there is a great deviation between the detection temperature detected by the outside air temperature detection means and real outside air temperature (for example, the detection temperature is remarkably higher than real outside air temperature), a determination value can be obtained instantly and appropriately by considering real outside air temperature without the necessity to wait for the outside air temperature detection means to get ready for detecting real outside air temperature appropriately.

For example, a processing which obtains a convergence temperature based on a variation magnitude of the detection temperature detected by the outside air temperature detection means and determines the determination value based on the obtained convergence temperature may be used as the above-mentioned second determination processing.

The outside air temperature detection means disposed in the vehicle is provided with a protection cover to prevent the characteristics of the outside air temperature detection means from being deteriorated by a flying stone, thermal strain according to the radiation heat from such as the radiator, or the like. Thereby, the outside air temperature detection means responses with a delay, and the detection temperature by the outside air temperature detection means gradually converges to real outside air temperature over time in cases where the detection temperature deviates greatly from real outside air temperature. The convergence temperature may be predicted based on a variation magnitude of the detection temperature detected by the outside air temperature detection means. Thereby, according the above-mentioned configuration, it is able to obtain the convergence temperature and determine the outside air temperature more appropriately.

The convergence temperature $T_c$ may be obtained, for example, based on a reference temperature $T_0$ and a detection temperature $T_n$ according to the following equation:

$$T_c = (T_n * \exp(t_n/\tau) - T_0)/(\exp(t_n/\tau) - 1) \tag{1}$$

wherein $T_0$: a reference temperature set as a detection temperature detected by the outside air temperature detection means at a predefined timing at which the speed detected by the speed detection means is accelerated equal to or greater than the predefined speed from a speed lower than the predefined speed, or at a predefined timing when a given interval has passed when the speed detected by the speed detection means is accelerated equal to or greater than the predefined speed from a speed lower than the predefined speed;

$T_n$: a detection temperature detected by the outside air temperature detection means after a predefined time $t_n$ passed from the predefined timing;

$\tau$: a time constant of the outside air temperature detection means.

Since the outside air temperature detection means responses with a first order lag, the detection temperature $T_n$ at present may be obtained from the initial temperature (reference temperature) $T_0$ and the convergence temperature $T_c$ according to the equation (2):

$$T_n = (T_0 - T_c)\exp(-t/\tau) + T_c \tag{2}$$

wherein $\tau$ is the time constant of the outside air temperature detection means.

By obtaining the convergence temperature $T_c$ from the equation (2), the equation (1) is obtained.

Using the convergence temperature $T_c$ obtained from the equation (1) as the determination value enables the outside air temperature to be determined more appropriately.

BRIEF DESCRIPTION OF THE DRAWINGS

FIG. 4 is an exemplary diagram illustrating a relation among real outside air temperature, detection temperature and determination value when the outside air temperature determination apparatus according to an embodiment of the present invention is employed.

DETAILED DESCRIPTION OF THE PREFERRED EMBODIMENTS

Figure 1:
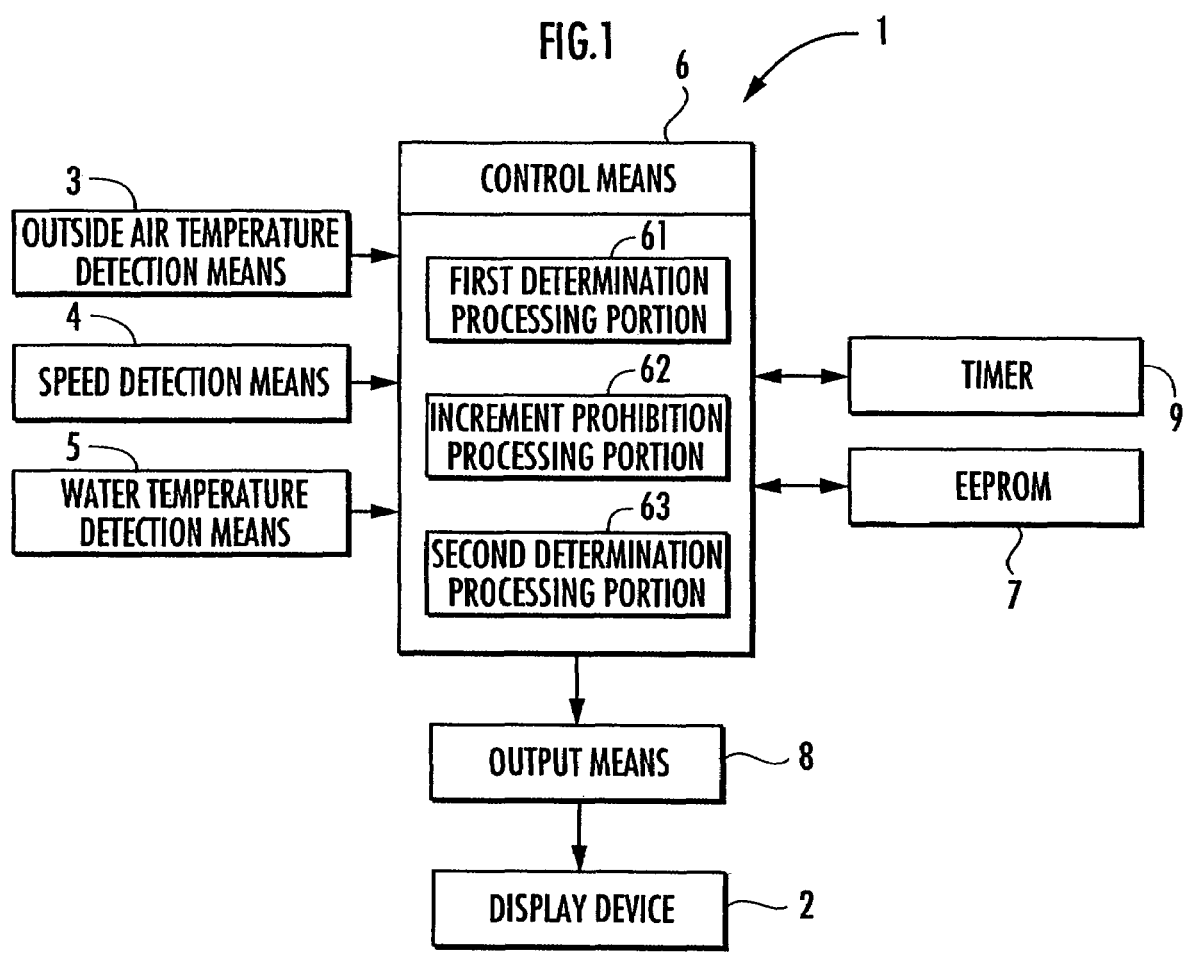
FIG. 1 is a block diagram illustrating an embodiment of an outside air temperature determination apparatus according to the present invention.

Hereinafter, an embodiment of the present invention will be described with reference to FIG. 1 to FIG. 4. An outside air temperature determination apparatus 1 in accordance with the embodiment of the present invention is disposed in an automobile (not shown) serving as a vehicle and allows an outside air temperature to be displayed on a display device 2 arranged inside the automobile.

The outside air temperature determination apparatus 1 comprises an outside air temperature detection means 3, a speed detection means 4, a water temperature detection means 5, a control means 6, a memory device 7, an output means 8 and a timer 9. The outside air temperature detection means 3, such as an outside air temperature sensor, is disposed at a front portion of the automobile, specifically at an inner side of a front bumper (not shown) to detect an air temperature of air inhaled from a radiator grill for cooling the radiator as an outside air temperature. The speed detection means 4, such as a vehicular speed sensor, detects the speed of the automobile. The water temperature detection means 5, such as a water temperature meter, detects temperature of engine water (temperature of a cooling medium such as a coolant for cooling the engine). The control means 6 obtains a determination value. The memory device, such as EEPROM 7, stores the determination value obtained by the control means 6. The output means 8 outputs the determination value to the display device 2.

The outside air temperature detection means 3 includes a protection cover to prevent the characteristics of the outside air temperature detection means 3 from being deteriorated by a flying stone, thermal strain according to the radiation heat from such as the radiator, or the like.

The control means 6 includes a first determination processing portion 61 and an increment prohibition processing portion 62. The first determination processing portion 61 is configured to obtain the determination value based on a detection temperature detected by the outside air temperature detection means 3. The increment prohibition processing portion 62 is configured to prohibit an increment from being added to the determination value which has a higher temperature than a determination value stored in EEPROM 7 in cases where the water temperature detected by the water temperature detection means 5 is equal to or higher than a predefined temperature (for example, 60° C.) and the vehicular speed detected by the speed detection means 4 is below a predefined speed $V_0$.

Since the detection temperature detected by the outside air temperature detection means 3 may have a possibility to deviate from real outside air temperature, a first determination processing of the first determination processing portion 61 is performed to add to or subtract from the deviation a given correction value which is determined preliminarily. If there is no deviation, the correction value is zero. In addition, the correction value may be configured to be set or altered by the user.

The control means 6 further includes a second determination processing portion 63 which performs a second determination processing. The second determination processing is a first-order lag filtering process to obtain a convergence temperature $T_c$ based on a variation magnitude of the detection temperature detected by the outside air temperature detection means 3 in cases where the water temperature detected by the water temperature detection means 5 is equal to or greater than the predefined temperature and the vehicular speed detected by the speed detection means 4 is shifted from a speed which is below the predefined speed $V_0$ to a speed which is equal to or greater than the predefined speed $V_0$. The second determination processing by the second determination processing portion 63 obtains the determination value based on the convergence temperature $T_c$.

Specifically, the convergence temperature $T_c$ is obtained based on a reference temperature $T_0$ and the detection temperature $T_n$ according to the following equation (3):

$$T_c = (T_n * \exp(t_n/\tau) - T_0)/(\exp(t_n/\tau) - 1) \quad (3)$$

wherein $T_0$: a reference temperature which is a detection temperature detected by the outside air temperature detection means 3 at a predefined timing $t_0$ at which a given interval (for example, 30 seconds) has passed after the vehicular speed detected by the speed detection means 4 is accelerated from a speed which is below the predefined speed $V_0$ to be equal to or greater than the predefined speed $V_0$;

$T_n$: a detection temperature detected by the outside air temperature detection means 3 after a predefined time $t_n$ passed from the predefined timing $t_0$; and $\tau$: a time constant of the outside air temperature detection means 3.

Since the outside air temperature detection means 3 responses with a first order lag, the detection temperature $T_n$ at present may be obtained from the initial temperature (reference temperature) $T_0$ and the convergence temperature $T_c$ according to the equation (4):

$$T_n = (T_0 - T_c)\exp(-t/\tau) + T_c \quad (4)$$

wherein, $\tau$ is the time constant of the outside air temperature detection means 3.

By obtaining the convergence temperature $T_c$ from the equation (4), the equation (3) is obtained. In addition, it is expected to alleviate the load on the calculation process by retrieving values of $\exp(t_n/\tau)$ at the predefined time $t_n$ from a data table having the values of $\exp(t_n/\tau)$ preliminarily stored in EEPROM 7.

Although the timing after 30 seconds has passed when the vehicular speed is accelerated from a speed which is lower than the predefined speed $V_0$ to a speed which is equal to or higher than the predefined speed $V_0$ is given as an example of the predefined timing $t_0$, it is not limited thereto. For example, it is acceptable to use a timing when the vehicular speed is accelerated from a speed which is lower than the predefined speed $V_0$ to a speed which is equal to or higher than the predefined speed $V_0$ as the predefined timing $t_0$.

Hereinafter, a processing of the control means 6 will be explained with reference to FIG. 2 and FIG. 3.

When the ignition is turned ON in STEP 1, whether the ignition has been turned OFF is confirmed in STEP 2. The process is terminated if the ignition has been turned OFF in STEP 2. In cases where the ignition has not been turned OFF in STEP 2, the process branches to STEP 3, the control means 6 determines whether the temperature of engine water output from the water temperature detection means 5 is equal to or higher than a predefined temperature (for example, 60° C.).

In cases where the temperature of engine water is lower than the predefined temperature (for example, 60° C.), it is conceived that the outside air temperature detection means 3 is hardly affected by the radiation heat from the radiator or the like, the process branches to STEP 9 where the control means 6 controls the first determination processing portion 61 to perform the first determination processing for obtaining the determination value based on the detection temperature from the outside air temperature detection means 3. The determination value is stored in EEPROM 7 and is output to the display device 2 to be displayed thereon. Thereafter, the process returns to STEP 2 in which whether the ignition has been turned OFF is confirmed.

In STEP 3, if the temperature of engine water detected by the water temperature detection means 5 is equal to or higher than the predefined temperature (for example, 60° C.), the process proceeds to STEP 4 in which the control means 6 controls the increment prohibition processing portion 62 to perform the increment prohibition processing which prohibits an increment from being added to the determination value.

The increment prohibition processing compares the determination value stored in EEPROM 7 with the determination value obtained from the detection temperature detected by the outside air temperature detection means 3, and prohibits the determination value stored in EEPROM 7 from being updated if the determination value obtained from the detection temperature detected by the outside air temperature detection means 3 is higher than the determination value stored in EEPROM 7. Accordingly, the outside air temperature detection means 3 can be prevented from detecting a temperature higher than real outside air temperature due to the radiation heat or the like from the radiator, which hence makes the determination value extremely high. If the determination value obtained from the detection temperature is lower than the determination value stored in EEPROM 7, the determination value stored in EEPROM 7 is updated by the determination value obtained from the detection temperature.

Subsequently, the process proceeds to STEP 5 in which whether the vehicular speed detected by the speed detection means 4 is equal to or greater than the predefined speed $V_0$ is determined. If the vehicular speed is below the predefined speed $V_0$, the process returns to STEP 2 in which whether the ignition has been turned OFF is determined. In cases where the vehicular speed is determined to be equal to or greater than the predefined speed $V_0$ in STEP 5, the process proceeds to STEP 6 in which the control means 6 controls the second determination processing portion 63 to perform the second determination processing.

Figure 3:
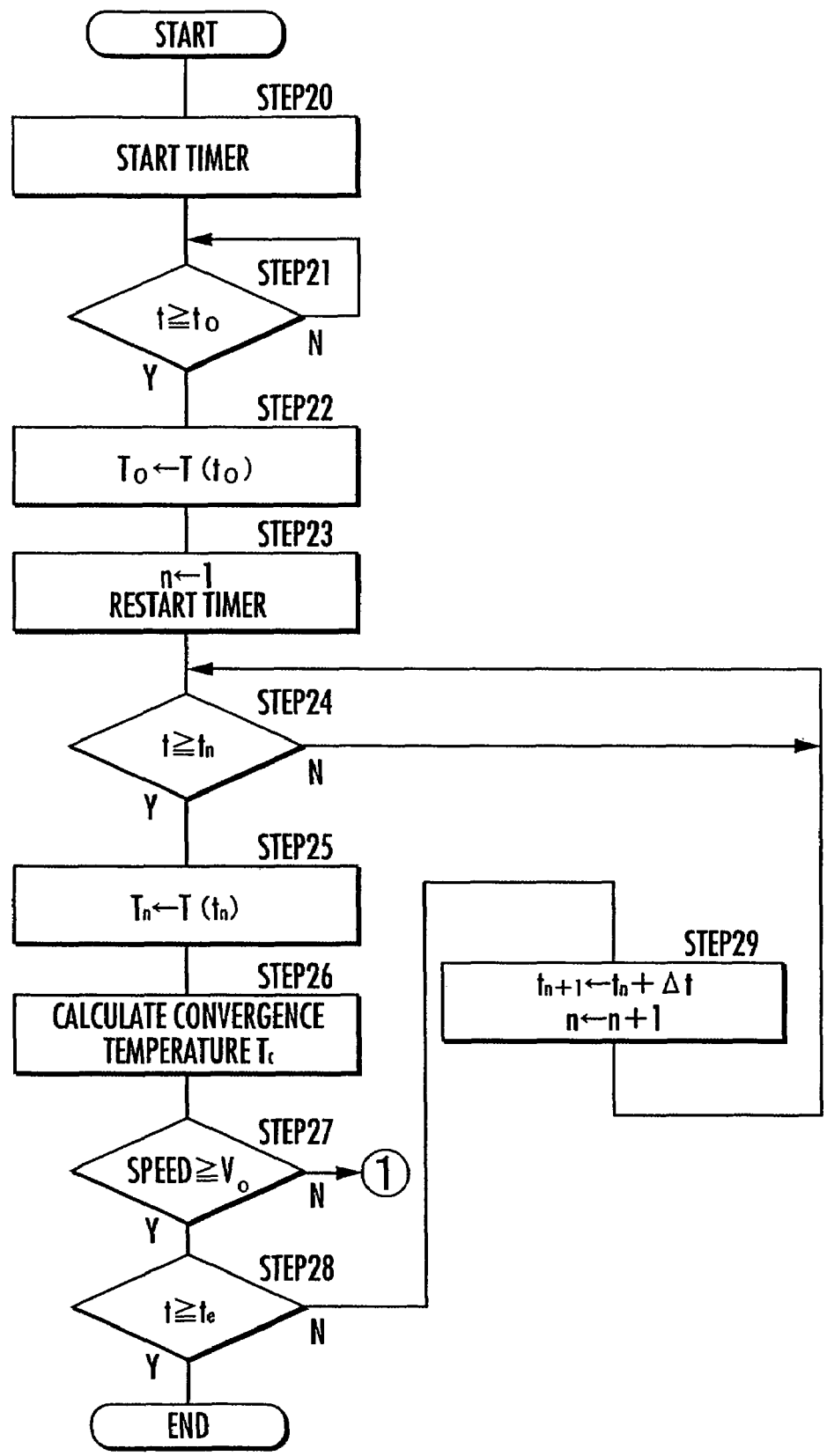
FIG. 3 is a flow chart illustrating a second determination processing of the outside air temperature determination apparatus according to an embodiment of the present invention.

As illustrated in FIG. 3, in the second determination processing, a timer 9 is started in STEP 20. Thereafter, the process proceeds to STEP 21 in which whether a given interval (for example, 30 seconds) has passed at a predefined timing $t_0$ according to the timer 9 is determined. If it is determined in STEP 21 that a given interval has passed at the predefined timing $t_0$, the process proceeds to STEP 22 in which the detection temperature detected by the outside air temperature detection means 3 is assigned to the reference temperature $T_0$.

Next, the process proceeds to STEP 23 in which "1" is assigned to "n" and the timer 9 is restarted. Thereafter, the process proceeds to STEP 24 in which the control means 6 determines whether the predefined time $t_n$ (a predefined time $t_1$) has passed according to the timer 9. If it is determined in STEP 24 that the predefined time $t_n$ ($t_1$) has passed, the process proceeds to STEP 25 in which there is assigned to $T_n$ the detection temperature T ($t_n$) detected by the outside air temperature detection means 3 at the predefined time $t_n$ ($t_1$) which is measured by the timer 9. Thereafter, the process proceeds to STEP 26.

In STEP 26, the control means 6 calculates the convergence temperature $T_c$ (predicted outside air temperature) according to the equation (3), and on the basis of the calculated convergence temperature $T_c$, obtains a determination value. The obtained determination value is stored in EEPROM 7 and output from the output means 8 to the display device 2 to be displayed thereon at the same time.

Thereafter, the process proceeds to STEP 27 in which the control means 6 determines whether a detection speed detected by the speed detection means 4 is equal to or greater than the predefined speed $V_0$. If the detection speed is lower than the predefined speed $V_0$, the process returns to STEP 2 in FIG. 2, the control means 6 determines whether the ignition has been turned OFF.

In STEP 27, if it is determined that the detection speed detected by the speed detection means 4 is equal to or greater than the predefined speed $V_0$, the process proceeds to STEP 28 in which whether a predefined time $t_e$ has passed is determined according to the timer 9. The predefined time $t_e$ is set to a time sufficient for the outside air temperature detection means 3 to get ready for detecting an outside air temperature appropriately. If it is determined that the predefined time $t_e$ has passed according to the timer 9, the second determination processing performed by the second determination processing portion 63 is terminated and the process proceeds to STEP 7 in FIG. 2 in which the first determination processing portion 61 performs the first determination processing to store in EEPROM 7 the determination value obtained on the basis of the detection temperature from the outside air temperature detection means 3 and output the determination value to the display device 2.

If it is determined in STEP 28 that the predefined time $t_e$ has not passed according to the timer 9, the process branches to STEP 29 in which "$t_n+\Delta t$" ($\Delta t$ is a given time predefined) is assigned to $t_{n+1}$; meanwhile, "n+1" is assigned to "n". Thereafter, the process returns to STEP 24 in which the control means 6 determines whether the predefined time $t_n$ has passed according to the timer 9. In other words, the second determination processing of the outside air temperature determination apparatus 1 according to the present embodiment updates the determination value every given time $\Delta t$.

If it is determined that the predefined time $t_n$ has passed, the process proceeds to STEP 25 in which $T_n$ is assigned with the detection temperature T ($t_n$) by the outside air temperature detection means 3 at the predefined time $t_n$ of the timer 9. Next, in STEP 26, the control means 6 calculates the convergence temperature $T_c$ according to the equation (3) and obtains the determination value based on the calculated convergence temperature $T_c$. The obtained determination value is stored in EEPROM 7 and output from the output means 8 to the display device 2 to be displayed thereon.

Figure 2:
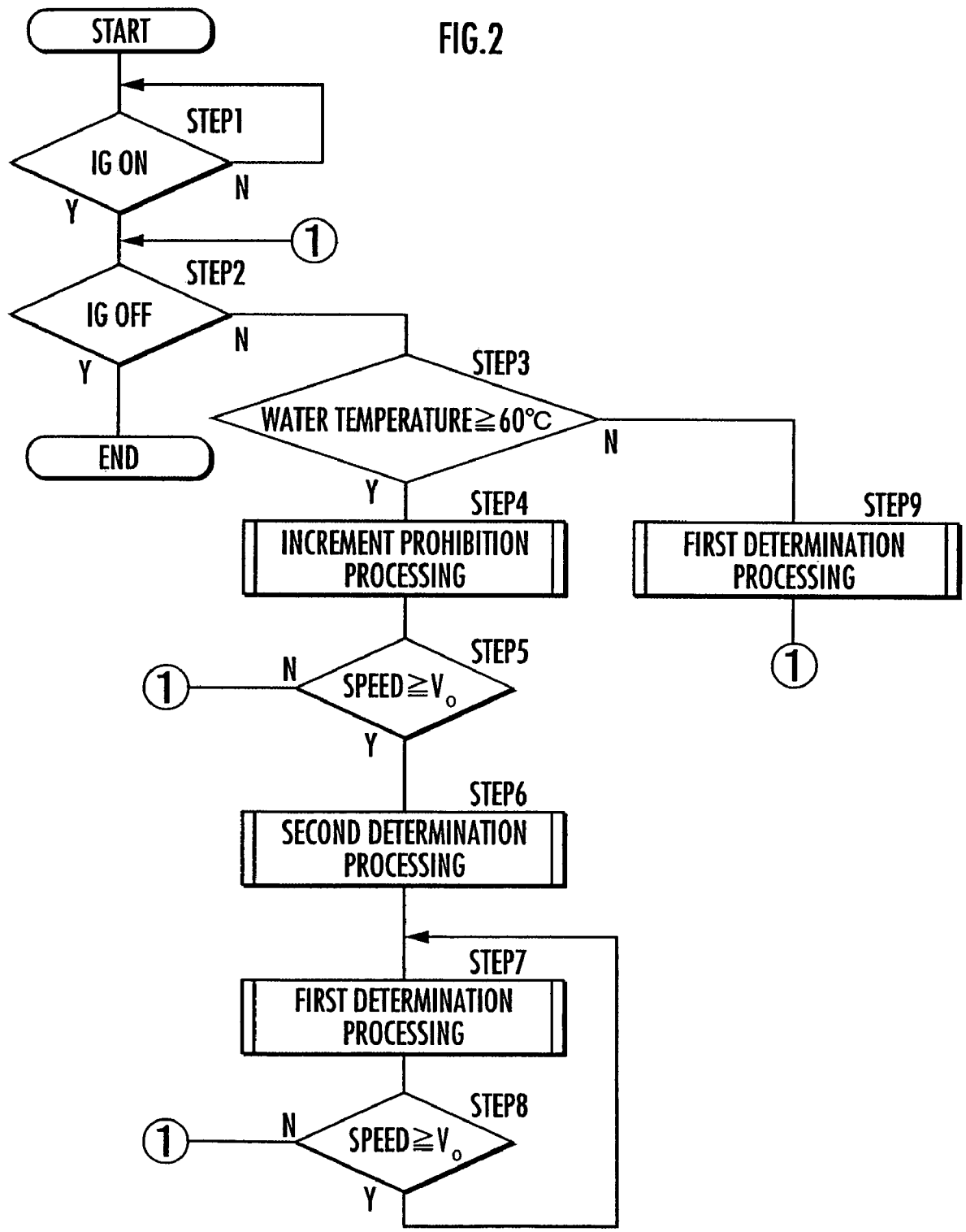
FIG. 2 is a flow chart illustrating a processing of a control means of the outside air temperature determination apparatus according to an embodiment of the present invention.

In cases where the predefined time $t_e$ has passed according to the timer 9 in STEP 28, the second determination processing performed by the second determination processing portion 63 is terminated, the process proceeds to STEP 7 in FIG. 2 in which the control means 6 controls the first determination processing portion 61 to perform the first determination processing. Thereafter, the process proceeds to STEP 8 in which whether the detection speed detected by the speed detection means 4 is equal to or higher than the predefined speed $V_0$ is determined. In cases where the detection speed is lower than the predefined speed $V_0$, the process returns to STEP 2 in which whether the ignition has been turned OFF is determined. In cases where the detection speed is equal to or higher than the predefined speed $V_0$, the process returns to STEP 7 in which the control means 6 controls the first determination processing portion 61 to perform the first determination processing.

According to the outside air temperature determination apparatus 1 of the present embodiment, when the vehicular speed is accelerated from a speed which is lower than the predefined speed $V_0$ to a speed which is equal to or greater than the predefined speed $V_0$ in cases where the temperature of engine water is at least at a predefined temperature (for example, 60° C.), the control means 6 predicts real outside air temperature according to the variation on the detection temperature detected by the outside air temperature detection means 3 and obtains the determination value based on the predicted outside air temperature (convergence temperature $T_c$) until the outside air temperature detection means 3 is sufficiently radiated to get ready to detect the outside air temperature appropriately.

Since the outside air temperature detection means 3 is disposed close to the radiator so as to catch wind in driving, it is susceptible to the radiation heat from the radiator. In cases where the automobile is maintained for a long time at a driving state where the vehicular speed is not lower than the predefined speed $V_0$, the radiator is cooled sufficiently by the wind in driving, thereby, the outside air temperature detection means 3 can detect the outside air temperature appropriately without being affected by the radiation heat from the radiator.

However, if a driving state where the vehicular speed is lower than the predefined speed $V_0$ according to a traffic jam or the like is continued, the radiator is not cooled sufficiently due to insufficient wind caught in driving; as a result, the detection temperature detected by the outside air temperature detection means 3 becomes extremely higher than real outside air temperature due to the radiation heat from the radiator. Therefore, the outside air temperature detection means 3 is provided with a protection cover so as to prevent heat strain according to the radiation heat from the radiator.

Accordingly, the time constant of the outside air temperature detection means 3 becomes greater. Even though the vehicle is accelerated from a driving state where the vehicular speed is lower than the predefined speed $V_0$ to a driving state where the vehicular speed is equal to or higher than the predefined speed $V_0$, it will take some time for the outside air temperature detection means 3 heated by the radiation heat from the radiator to emit heat sufficiently to get ready for detecting the outside air temperature appropriately.

During that period, if the determination value is obtained on the basis of the detection temperature detected by the outside air temperature detection means 3, the determination value will become extremely higher than real outside air temperature; accordingly, the outside air temperature displayed on the display device 2 will be higher than real outside air temperature as well.

It is conceivable that the increment prohibition processing which prohibits an increment on the determination value will not be performed until the outside air temperature detection means 3 is radiated sufficiently to get ready for detecting the outside air temperature appropriately. However, the temperature based on the past detection temperature stored in EEPROM 7 is kept to be displayed on the display device 2 for a long time, thus, even though real outside air temperature is varying, it is impossible to display the outside air temperature appropriately. Moreover, when a driver or the like of the automobile clearly judges that the outside air temperature has changed or when the outside air temperature displayed on the display device 2 is remarkably different to the outside air temperature displayed on a display device disposed on the shoulder of the road, it is likely for the driver or the like to misjudge that the outside air temperature detection means 3 of the vehicle is malfunctioning.

As illustrated in FIG. 4, according to the outside air temperature determination apparatus 1 of the present embodiment, when the driving state of the vehicle is shifted from a driving state where the vehicular speed is lower than the predefined speed $V_0$ to a driving state where the vehicular speed is equal to or greater than the predefined speed $V_0$, the control means 6 controls the second determination processing portion 63 to perform the second determination processing, obtains the convergence temperature $T_c$ (predicted temperature) based on the variation on the detection temperature detected by the outside air temperature detection means 3, and obtains the determination value based on the convergence temperature $T_c$.

Thereby, even in cases where real outside air temperature varies when the vehicle is driving below the predefined speed $V_0$, when the driving state of the vehicle is shifted from a driving state where the vehicular speed is lower than the predefined speed $V_0$ to a driving state where the vehicular speed is equal to or greater than the predefined speed $V_0$, the outside air temperature may be determined instantly and appropriately, and a correct outside air temperature may be displayed on the display device 2.

It has been explained that in the outside air temperature determination apparatus 1 of the present embodiment, the second determination processing performed by the second determination processing portion 63 is terminated when the predefined time $t_e$ has passed according to the timer 9 (STEP 28 in FIG. 3) and is switched to the first determination processing performed by the first determination processing portion 61 (STEP 7 in FIG. 2). However, the condition for switching the second determination processing performed by the second determination processing portion 63 to the first determination processing performed by the first determination processing portion 61 is not limited thereto. For example, the second determination processing performed by the second determination processing portion 63 may be terminated and switched to the first determination processing performed by the first determination processing portion 61 when an outside air temperature predicted according to the second determination processing performed by the second determination processing portion 63 is equal to a detection temperature detected by the outside air temperature detection means 3.

The time constant τ of the outside air temperature detection means 3 according to the present embodiment may be a fixed number, or may vary according to the vehicular speed detected by the speed detection means 4. Herein, since the air volume exerted on the outside air temperature detection means 3 during the driving varies according to the vehicular speed, it is conceivable that the heat amount released from the outside air temperature detection means 3 varies accordingly. In this case, by allowing the time constant τ of the outside air temperature detection means 3 to vary according to the vehicular speed detected by the speed detection means 4, it is possible to calculate the convergence temperature $T_c$ more accurately.

Although the determination value is described as being displayed on the display device 2 in the outside air temperature determination apparatus 1 of the present embodiment, it is not limited thereto. The determination value of the outside air temperature detected by the outside air temperature determination apparatus 1 of the present embodiment may be used, for example, in a notification device for notifying a possibility of road surface freezing according to a low outside air temperature, in a night vision system for determining a threshold value in a binarization process based on the determination value of outside air temperature obtained according to the outside air temperature determination apparatus, an automatic air conditioning system and the like.

Although the detection temperature of the outside air temperature detection means 3 is illustrated with a coarse accuracy in FIG. 4 of the present embodiment, it is possible to detect the temperature by leveling up the detection accuracy of the outside air temperature detection means 3 so that a smooth curve may be drawn. By raising the detection accuracy of the outside air temperature detection means 3 to calculate the convergence temperature $T_c$, it is possible to obtain the convergence temperature $T_c$ more accurately.

In the outside air temperature determination apparatus 1 of the embodiment, whether the outside air temperature detection means 3 is affected by the radiation heat from the radiator is determined by using the water temperature detection means 5 to detect whether the detection temperature is at least at 60° C. in STEP 3 of FIG. 2. It is also acceptable to use other determination means.

In cases where a heat emitting device (heat emitting means) in addition to the radiator is present to affect the determination on outside air temperature appropriately by the outside air temperature detection means 3, a determination means may be provided to determine whether the heat emitting device affects the determination on outside air temperature appropriately by the outside air temperature detection means 3.

When an automobile parked in a garage where outside air temperature is significantly higher than air temperature starts to move, it will take some time for the outside air temperature in the garage detection means 3 to detect real outside air temperature appropriately due to the response lag. Even in this situation, it is possible to use the outside air temperature determination apparatus of the present embodiment to predict the outside air temperature instantly and appropriately as the determination value to be displayed on the display device 2.

In this case, it is possible to configure the outside air temperature determination apparatus 1 of the embodiment so that in cases where the fact that the automobile has been moved out of the garage to the outside is detected by the control means 6 according to a condition that the detection speed detected by the speed detection means 4 is not less than the predefined speed, the control means 6 controls the second determination processing portion 63 to perform the second determination processing and to predict real outside air temperature as the determination value based on the variation of the detection temperature detected by the outside air temperature detection means 3.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. An outside air temperature determination apparatus disposed in a vehicle, comprising:
   an outside air temperature detection means for detecting an outside air temperature;
   a control means having a first determination processing portion which performs a first determination processing to obtain a determination value based on the detection temperature detected by the outside air temperature detection means; and a speed detection means for detecting a speed of the vehicle, wherein the control means includes a second determination processing portion which performs a second determination processing to predict a real outside air temperature based on a variation on the detection temperature detected by the outside air temperature detection means and to obtain a determination value based on the predicted outside air temperature; and controls the second determination processing portion to perform the second determination processing prior to the first determination processing to be performed by the first determination processing portion when the speed detected by the speed detection means is accelerated equal to or greater than a predefined speed from a speed lower than the predefined speed.

2. The outside air temperature determination apparatus according claim 1, wherein the second determination processing obtains a convergence temperature based on a variation magnitude of the detection temperature detected by the outside air temperature detection means, and obtains the determination value based on the obtained convergence temperature.

3. The outside air temperature determination apparatus according claim 2, wherein the convergence temperature $T_c$ is obtained based on a reference temperature $T_0$ and a detection temperature $T_n$ according to the following equation (1):

$$T_c = (T_n * \exp(t_n/\tau) - T_0)/(\exp(t_n/\tau) - 1) \quad (1)$$

wherein $T_0$: a reference temperature set as a detection temperature detected by the outside air temperature detection means at a predefined timing when the speed detected by the speed detection means is accelerated equal to or greater than the predefined speed from a speed lower than the predefined speed, or at a predefined timing after a given interval passed when the speed detected by the speed detection means is accelerated equal to or greater than the predefined speed from a speed lower than the predefined speed;

$T_n$: a detection temperature detected by the outside air temperature detection means after a predefined time $t_n$ passed from the predefined timing;

$\tau$: a time constant for the outside air temperature detection means.

* * * * *